United States Patent
Cuciurean-Zapan et al.

(10) Patent No.: US 7,050,627 B2
(45) Date of Patent: May 23, 2006

(54) BLACK COMPONENT GENERATION

(75) Inventors: Clara Cuciurean-Zapan, Fairport, NY (US); Fritz F. Ebner, Rochester, NY (US); Scott A. Bennett, Canandaigua, NY (US)

(73) Assignee: Xerox Corporation, Stamford, CT (US)

( * ) Notice: Subject to any disclaimer, the term of this patent is extended or adjusted under 35 U.S.C. 154(b) by 769 days.

(21) Appl. No.: 09/896,460

(22) Filed: Jun. 29, 2001

(65) Prior Publication Data
US 2003/0043389 A1    Mar. 6, 2003

(51) Int. Cl.
*H04N 1/46* (2006.01)
*G06K 9/00* (2006.01)

(52) U.S. Cl. .................. 382/167; 358/520; 358/530
(58) Field of Classification Search ............... 358/529, 358/500, 201, 517, 518, 520, 530; 382/162, 382/166, 167
See application file for complete search history.

(56) References Cited

U.S. PATENT DOCUMENTS

| | | | | |
|---|---|---|---|---|
| 4,887,150 A | * | 12/1989 | Chiba et al. ............... | 358/523 |
| 5,126,838 A | | 6/1992 | Ohsawa et al. ............. | 358/500 |
| 5,359,436 A | * | 10/1994 | Dichter et al. ............. | 358/500 |
| 5,402,245 A | | 3/1995 | Motta et al. ................ | 358/1.9 |
| 5,402,253 A | | 3/1995 | Seki ........................... | 358/518 |
| 5,528,386 A | * | 6/1996 | Rolleston et al. ........... | 358/522 |
| 5,612,793 A | * | 3/1997 | Ito et al. .................... | 358/500 |
| 5,739,917 A | * | 4/1998 | Shu et al. ................... | 358/2.1 |
| 5,917,994 A | | 6/1999 | Perumal, Jr. et al. ....... | 358/1.9 |
| 5,992,971 A | | 11/1999 | Takahashi et al. .......... | 347/43 |
| 6,031,630 A | | 2/2000 | Blair et al. ................. | 358/1.9 |
| 6,039,434 A | | 3/2000 | Moroney ..................... | 347/43 |
| 6,137,596 A | | 10/2000 | Decker et al. .............. | 358/1.9 |
| 6,181,829 B1 | * | 1/2001 | Clark et al. ................ | 382/273 |
| 2003/0043389 A1 | * | 3/2003 | Cuciurean-Zapan et al. | 358/1.9 |

OTHER PUBLICATIONS

Device-Independent Color Imaging and Imaging System Integration, Proceedings (SPIE—The international Society for Optical Engineering. vol. 1909, by Ricardo J. Motta and Hapet A. Berberian, Feb., 1993.

(Continued)

*Primary Examiner*—Jerome Grant, II
(74) *Attorney, Agent, or Firm*—Fay, Sharpe, Fagan, Minnich & McKee, LLP (57) ABSTRACT

A system and method for generating achromatic components for output incorporate receiving input color data defined in a first color space. The received input color data is converted to intermediate color data defined in an intermediate color space. Typically the intermediate color space is defined only in terms of chromatic components. A black or achromatic component is then calculated. The black or achromatic color component is a function of both the input color data in the first color space and the intermediate color data in the intermediate color space. This black or achromatic color component is associated with the intermediate color data for further processing and output.

8 Claims, 5 Drawing Sheets

OTHER PUBLICATIONS

The Black Printer, by R. Holub, C. Pearson, and W. Kearsley. Journal of Imaging Technology, vol. 15, No. 4, Aug. 1989.

RGB-YMCK Color Conversion by Application of the Neural Networks, Transforms & Transportability of Color, the First IS&T/SID Color Imaging Conference, by Gabriel Marcu and Kansei Iwata, Graphica Computer Corp., Tokyo, Japan, 1993.

Black Addition, Undercolor Removal, and Gray Component Replacement, by Raja Balasubramanian and Martin Maltz, Aug. 26, 1997.

* cited by examiner

BLACK COMPONENT GENERATION

BACKGROUND OF THE INVENTION

The present invention relates to the digital color image processing arts. It finds particular application in conjunction with generating a black component for output in CMYK color space, and will be described with particular reference thereto. However, it is to be appreciated that the invention is applicable to various transforms between input and output color spaces.

Color in printed digital images results from the combination of a limited set of colors over a small area in densities selected to integrate the desired color response. This is accomplished in many printing devices by reproducing so called "separations" of the image, where each separation provides varying values of a single primary color. When the separations are combined together, the result is a full color image.

The particular color of each separation depends on the "color space" being implemented. Examples of color space models include, RGB, CMY, CMYK, Lab, Yes, YIQ, HSV, HLS.

In practice, color images are commonly printed in a cyan-magenta-yellow-black (CMYK) color-space. This color space is based upon the CMY color-space, but attempts to improve the quality of "black" in the image and reduce use of color inks, or toners, or dies, or the like. In theory, images can be printed using the CMY color space, with a mixture of the three colors producing black. In practice, however, printing with only cyan, magenta, and yellow inks often does not produce the highest quality black, but instead results in a muddy brownish output due to impurities in the inks, the particular paper or other image recording media used, and the partial reflection of light instead of its complete absorption into the inks. Furthermore, select use of black ink in place of the primary colors reduces expense and minimizes the total amount of ink used which is often desirable in ink-jet and other printing applications where the ability of the recording substrate to absorb ink is limited.

Methods for converting to the CMYK color space include those referred to as "under color removal" (UCR) and "gray component replacement" (GCR). UCR/GCR methods vary, but commonly involve examining the individual pixels of an image using the lowest or "darkest" of the three cyan-magenta-yellow colors to determine an amount of black to be added (Gray Component Replacement). One or more of the CMY colors are then adjusted to account for the addition of black ink (Under Color Removal). For example, if a given pixel of an image is represented in the CMY color space by C=0.5, M=0.4, and Y=0.25, then the black or K value would be based upon the lowest or Y value. In a 50% gray component replacement (GCR) method, K=(50% of Y)=0.125. In a typical under color removal (UCR) step, the remaining CMY values would then each be reduced by 0.125 so that the resulting UCR/GCR pixel is represented by C=0.375, M=0.275, Y=0.125, and K=0.125. Of course, other UCR/GCR methods are known, but each seeks to determine the level of black for a given pixel, based only on the intermediate color space, e.g. CMY.

The present invention contemplates a new method and apparatus to generate output color components that yield increased output quality.

SUMMARY OF THE INVENTION

A method of generating a black component of an output color includes receiving input color data defined in a first color space and converting the received input data to intermediate color data defined in a second or intermediate color space. A first black component factor is calculated from the input color data and a second black component factor is calculated from the intermediate color data. The first and second black component factors are then combined.

In accordance with another aspect of the present invention, the receiving input color data includes receiving color separation values such as RGM, CMY, LAB, YES, YIQ, HSV, HLS, and the like.

In accordance with another aspect of the present invention, the converting step includes converting the received input color to CMY.

In accordance with another aspect of the present invention, the calculating a first black component factor includes applying a function to the input color separations dependent upon predefined threshold values for all or some of the input color separations.

In accordance with another aspect of the present invention, the calculating a first black component includes applying a function to HSV input color data.

In accordance with another aspect of the present invention, the calculating a second black component factor includes calculating the second black component factor from the converted CMY values.

In accordance with another embodiment of the present invention, a method of outputting digital color image data in an image output terminal includes converting input color components corresponding to a color in a first color space to intermediate components in a second color space including only chromatic components. An output black component is then derived from both the intermediate components and the input components.

In accordance with another aspect of the present invention, the method further includes adjusting the intermediate components based on the derived output black component. This adjustment includes gray component replacement and under color removal and the like.

In accordance with another aspect of the present invention, the method further includes outputting data based on both the intermediate components and the output black component.

In accordance with another aspect of the present invention, the deriving an output black component includes applying a defined process to the input components, applying a defined process to the intermediate color components and combining the processed input components with differently processed intermediate components.

In accordance with another aspect of the present invention, the differently processed intermediate components include minimized CMY values.

In accordance with another embodiment of the present invention, a system for creating an achromatic component for an output color space from input color space including only chromatic components includes a receiver which receives input color separations in the input color space and a converter that converts input color separations to intermediate color separations. The system further includes an achromatic component generator in data communication with the receiver and the converter. The achromatic component generator calculates an achromatic color separation from functions including at least one input color separation and intermediate color separation.

In accordance with another aspect of the present invention, the input space is defined in HSV and the functions include a first function g(H,S,V), and a second function h depending on the intermediate color separation. The system further includes a calculator that calculates g(H,S,V) by implementing the equation.

$$g(H, S, V) = 1 - \begin{cases} a_H S^2 + b_H S + c_H & \text{for } S > S_t \text{ and } V > V_t \\ 1 - \left(1 - \dfrac{V}{V_t}\right)^2 & \text{for } S \leq S_t \text{ and } V < V_t \\ (a_H S^2 + b_H S + c_H)\left[1 - \left(1 - \dfrac{V}{V_t}\right)^2\right] & \text{for } S > S_t \text{ and } V < V_t \\ 1 & \text{for } S \leq S_t \text{ and } V > V_t \end{cases}$$

In accordance with another aspect of the present invention, the converter converts the input color separations to CMY.

In accordance with another aspect of the present invention, the system further includes a post processor that adjusts the intermediate color separations based on the achromatic color separation.

BRIEF DESCRIPTION OF THE DRAWINGS

The invention may take form in various components and arrangements of components, and in various steps and arrangements of steps. The drawings are only for purposes of illustrating preferred embodiments, and are not to be construed as limiting the invention.

DETAILED DESCRIPTION OF THE PREFERRED EMBODIMENTS

Figure 1:
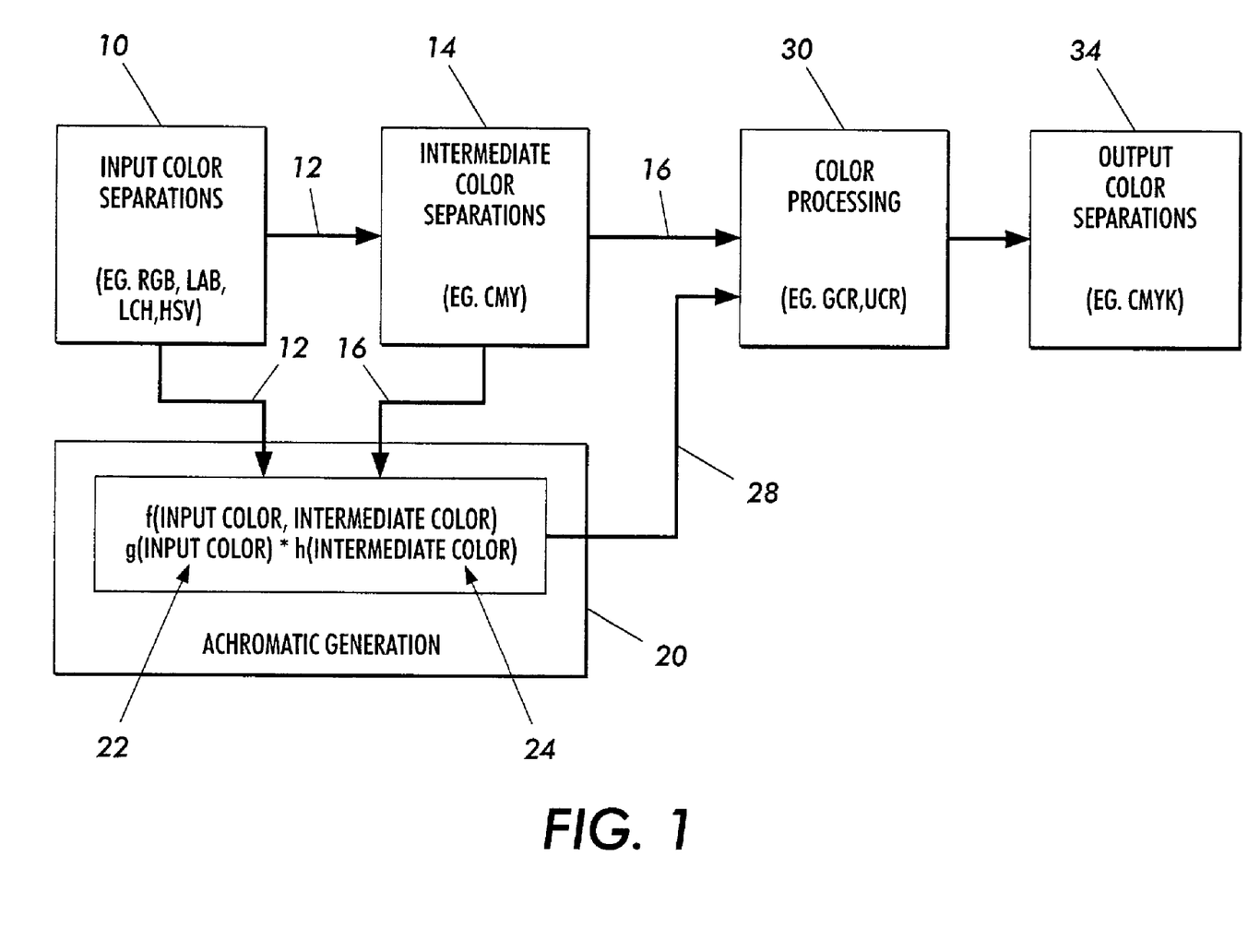
FIG. 1 shows a system illustrated as a functional block diagram which suitably practices the present invention.

With reference now to FIG. 1, a system for creating a black or achromatic component from a color represented by an input color space includes a receiver 10 which receives input color separations in the input color space. The discussion herein will focus on input color space RGB, but those skilled in the art will appreciate that alternate input components can be depicted in a variety of different formats such as Lab, LCH, HSV and the like. Typically, input color space is defined in three dimensions and the components describing individual or particular colors are collectively called tristimulus values while individual components are referred to as color separations. The input color separations 12 are then supplied to an intermediate color generator 14 or means for converting the input color separations 12 to intermediate color separations 16. Typically, the intermediate color separations 16 are generated through lookup tables, one-minus algorithms or other functions. As used herein intermediate color space will be referred to as CMY although those skilled in the art will appreciate that other intermediate color spaces may also be used.

In data communication with receiver 10 and intermediate color generator 14 is an achromatic component generator 20. The achromatic component generator 20 receives a representation of the color in both the input color space and the intermediate color space. As more fully discussed below, the achromatic component generator 20 applies a function f to both representations to calculate a black or achromatic component 28. In one preferred embodiment, the achromatic component generator 20 applies different processes or functions to the input components 12 and the intermediate components 16. From this a first black component 22 and a second black component 24 are derived, and combined into achromatic component 28. The achromatic component 28 is forwarded to post processor 30 which combines the achromatic component 28 with intermediate components 16 and then processes the color separations as is known to those skilled in the art, for example gray component replacement, ink limit, tone reproduction curves and the like. The system then outputs color separations via an image output terminal 34 which can include a printer, copy machine, xerographic device, and the like.

Figure 2:
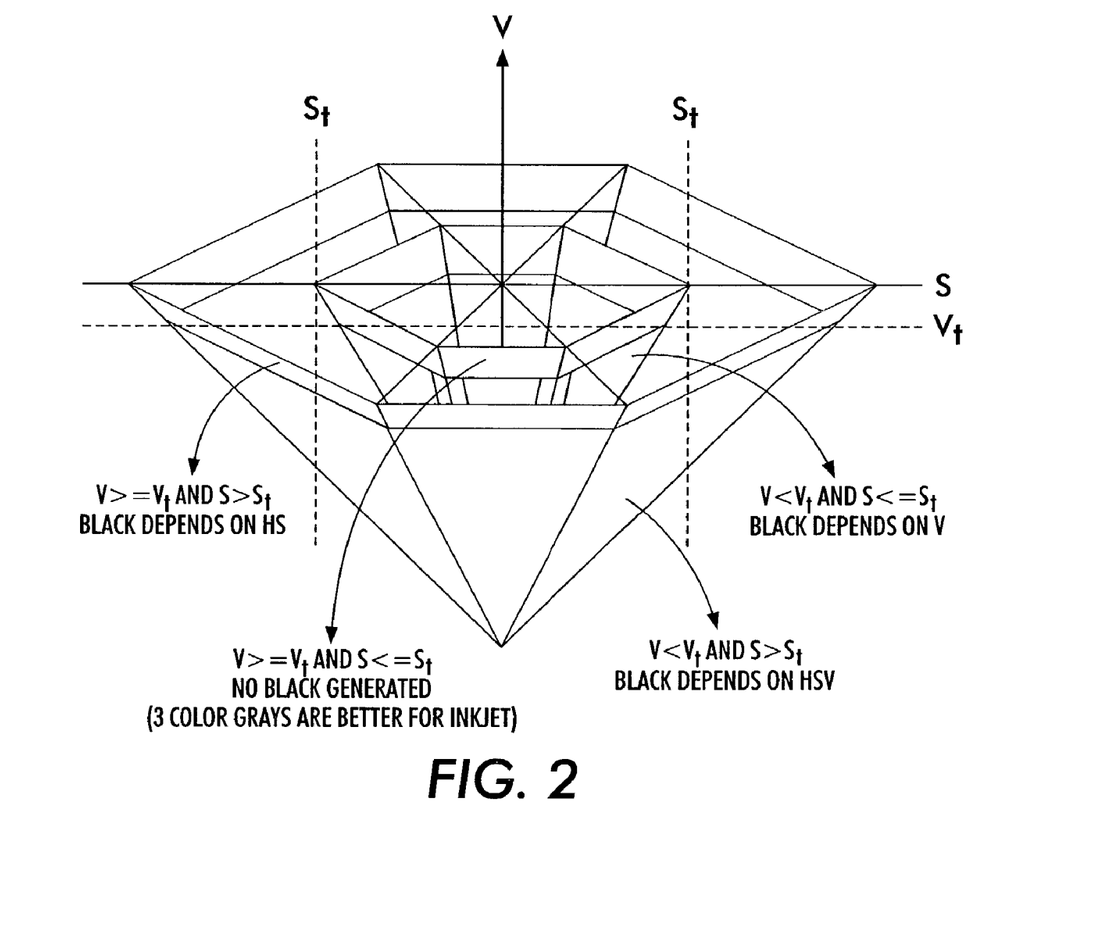
FIG. 2 is a depiction of color space showing variables and thresholds at selected positions within that color space and their effect on black component generation.

A new method for black component generation takes into account not only the intermediate color values 16 (for example CMY) but also the corresponding input color values 12 (for example RGB or HSV). Specifically a black or achromatic component 28 is generated according to the following strategy (FIG. 2):

$$K = f(\text{input color, intermediate color}) \quad \text{EQ(1)}$$

The function f is customized according to the specific requirements. For example, for an inkjet printer, it is preferable to start turning on black later because the black dots increase the graininess of skin tones, or sweeps of yellow to black for light colors it is preferable to use three color black or process black. A specific embodiment of equation (1) will be described below.

The black component 28 is generated as a function of the first black component 22 e.g. the HSV values of the input RGB color separations 12 and the second black component 24, e.g. min(C,M,Y) 16, (where C=255-R, M=255-G, Y=255-B are the intermediate colors) as follows:

$$K = f(H,S,V,C,M,Y) = g(H,S,V) * h(C,M,Y) \quad \text{EQ(2)}$$

where the first black component 22 is represented as $$g(H,S,V) = 1 - g_1(V) * g_2(S,H) \quad \text{EQ(3)}$$

and the second black component 24 is represented as $$h(C,M,Y) = \min(C,M,Y) \quad \text{EQ(4)}$$

$g_1$ and $g_2$ are defined in equation (5) below.

$$g_1(V) = \begin{cases} 1 - \left(1 - \dfrac{V}{V_t}\right)^2 & \text{if } V < V_t \\ 1 & \text{otherwise} \end{cases} \quad \text{EQ (5a)}$$

and $$g_2(S, H) = \begin{cases} a_H S^2 + b_H S + c_H & \text{if } S > S_t \\ 1 & \text{otherwise} \end{cases} \quad \text{EQ (5b)}$$

where $V_t$ and $S_t$ are experimentally determined thresholds. For $V > V_t$ and $S <= S_t$ no black is generated. $V_t = 0.86$ and $S_t$=0.52 are example values that worked well for an ink-jet system. These threshold values usually gave better results when $V_t > S_t$.

The amount of black produced is given by the function f and depends on the position of the input color component 12 e.g. HSV space, and on the intermediate color component 16 e.g. CMY values. This dependence on the input color space HSV is depicted in FIG. 2. Those skilled in the art will recognize that the thresholds and parameters may likely be different for different print modes and media.

Power 2 in the definition of $g_1$ proved to be less aggressive as a linear function in certain parts of the color space. For dark and low saturation colors a dependence of the amount of black generated only on V is sufficient.

For $g_2$, a curve similar to $g_1$ was first generated depending only on saturation S and the threshold $S_t$:

$$g_2(S) = 1 - ((S - S_t)/(1 - S_t))^2 \text{ if } S > S_t \text{ and } 1 \text{ otherwise} \quad \text{EQ(6)}$$

But high saturation light colors had high graininess (such as almost pure yellow in black to yellow sweeps) due to the presence of the big volume black drops. Accordingly, in another embodiment, the amount of black generated depends on the hue angle for select high value high saturation input colors, which improves the image quality noticeably.

Figure 3:
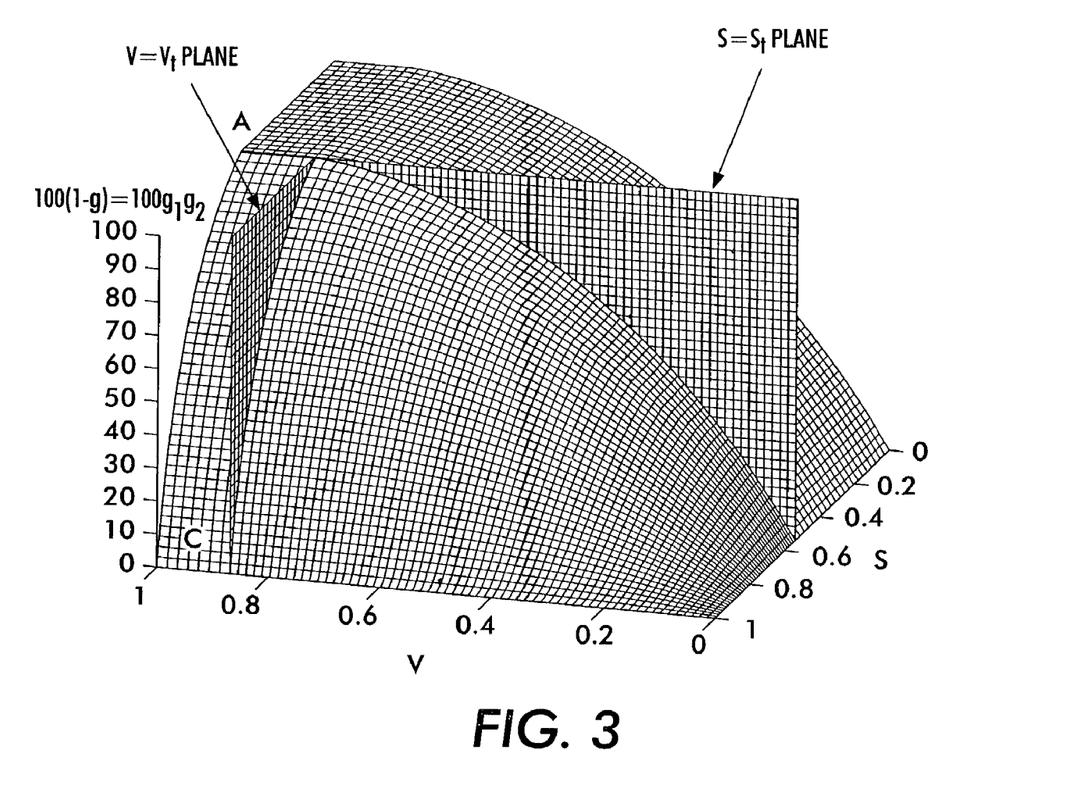
FIG. 3 is an illustration of black generated as a function of V and S.

FIG. 3 is a plot of the product $g_1 g_2$ scaled by a factor of 100 as a function of V and S when $g_2$ depends only on saturation (see Equation 6 above) and $g_1$ is defined by Equation 5a.

Again, the $3^{rd}$ axis is the value of the $g_1 g_2$ product. A value of 0 (for example at point C where S=V=1)) means 100% black generation and a value of 1 (100—for example at point A where S=$S_t$ and V=1) means no black generated. As inferred above, this led to the presence of black dots for very light (V close to 1), high saturation (S close to 1) colors. To avoid these artifacts for S=V=1 (at point C) the value of the product $g_1 g_2$ is shifted higher than 0, such that less black is produced.

Figure 4:
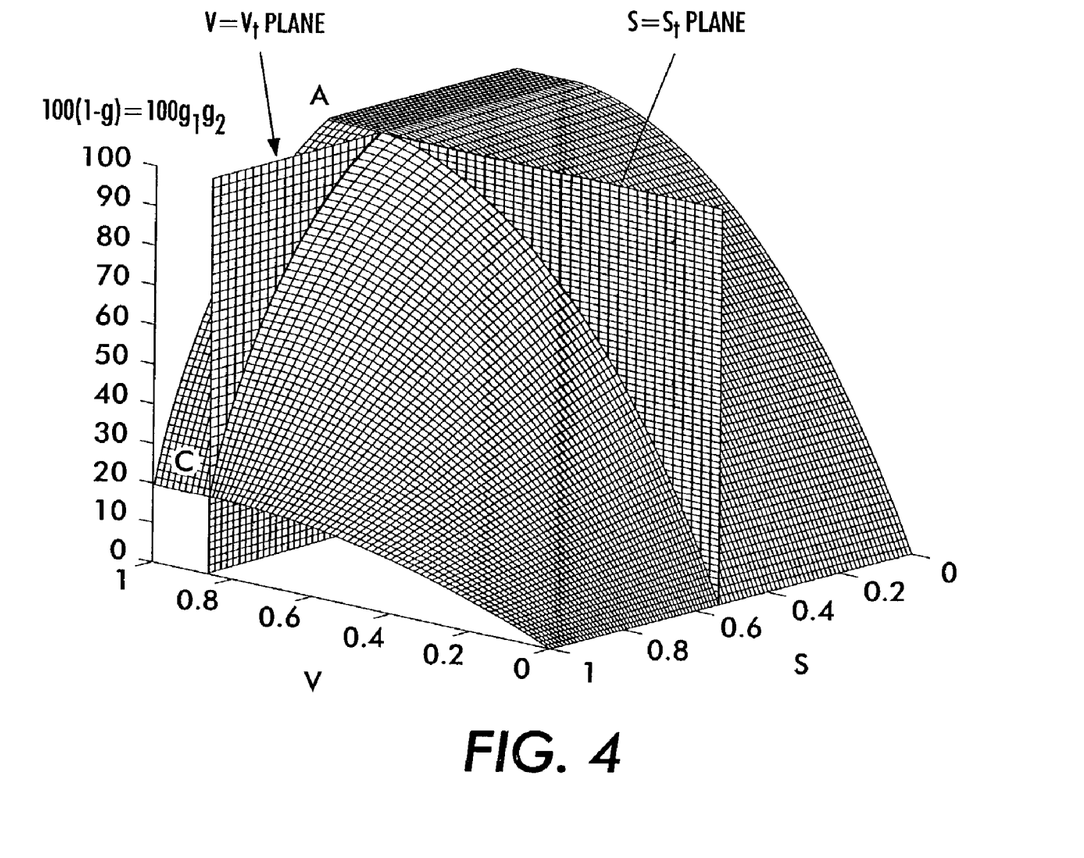
FIG. 4 is an illustration of black generated as a function of V, S, and hue angle.

Additionally the position of C was determined to vary with the hue angle H. In short generating less black as value and saturation increase and results in a curve of the type shown in FIG. 4, such that the position of point C varies as a function m of H (m(H)). To achieve this, a second degree curve was fitted (for V=1) to the following data/aim points:

A($S_t$,1)

C(1, m(H))

B(0.5($S_t$+1),0.75)

$g_2$ was derived by solving system (7) below.

The first point (A) shows that no black should be generated for $S \leq S_t$.

The second point (C) introduces the dependence on H as a function m(H), where H is the hue angle. If m(H)=0, then the dependence described in FIG. 3 and Equations 5a and 6 is obtained.

The third point (B) is an anchor point movable for different cases and also provides enough data to solve the system of equations obtained by requiring that the function defined in Equation 5b passes through the points A, B and C.

The system is:

$$\begin{cases} a_H S_t^2 + b_H S_t + c_H = 1 \\ a_H + b_H + c_H = m(H) \\ a_H (S_t + 1)^2 + 2 b_H (S_t + 1) + 4 c_H = 3 \end{cases} \quad \text{EQ (7)}$$

The solution of system (7) is:

$$\begin{cases} a_H = \dfrac{2m(H) - 1}{(1 - S_t)^2} \\ b_H = \dfrac{2S_t - m(H) - 3m(H) S_t}{(1 - S_t)^2} \\ c_H = \dfrac{1 - 2S_t + m(H) S_t + m(H) S_t^2}{(1 - S_t)^2} \end{cases} \quad \text{EQ (8)}$$

Once more if m(H)=0 then $g_2$ from Equation 5b is the same as $g_2$ from Equation 6.

Figure 5:
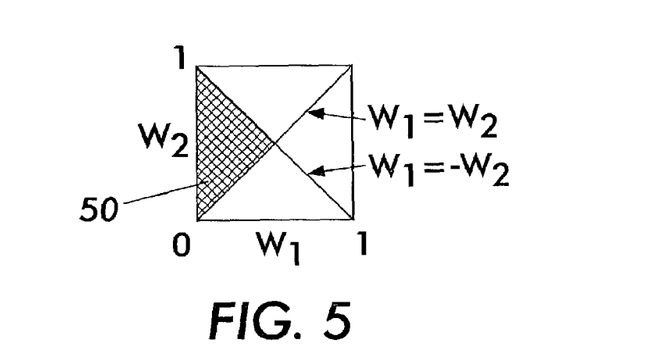
FIG. 5 is a graph of possible weighting values for modulating H.

The function m is a modulated value of H, because the same strategy for black generation was desired for certain groups of colors. This will be exemplified below after the definition of 'm' is introduced. 'm' is defined as in Equation 9:

$$m(H) = W_1 \cos(3H) + W_2 \quad \text{EQ(9)}$$

where $W_1$ and $W_2$ are selected such that $0 \leq m(H) \leq 1$ which means $0 \leq W_1, W_2 \leq 1$, $W_1 + W_2 \leq 1$, $W_2 - W_1 \geq 0$, which limits the possible pairs of ($W_1$, $W_2$) values to the shaded region 50 in the plane $W_1 W_2$ from FIG. 5.

Figure 6:
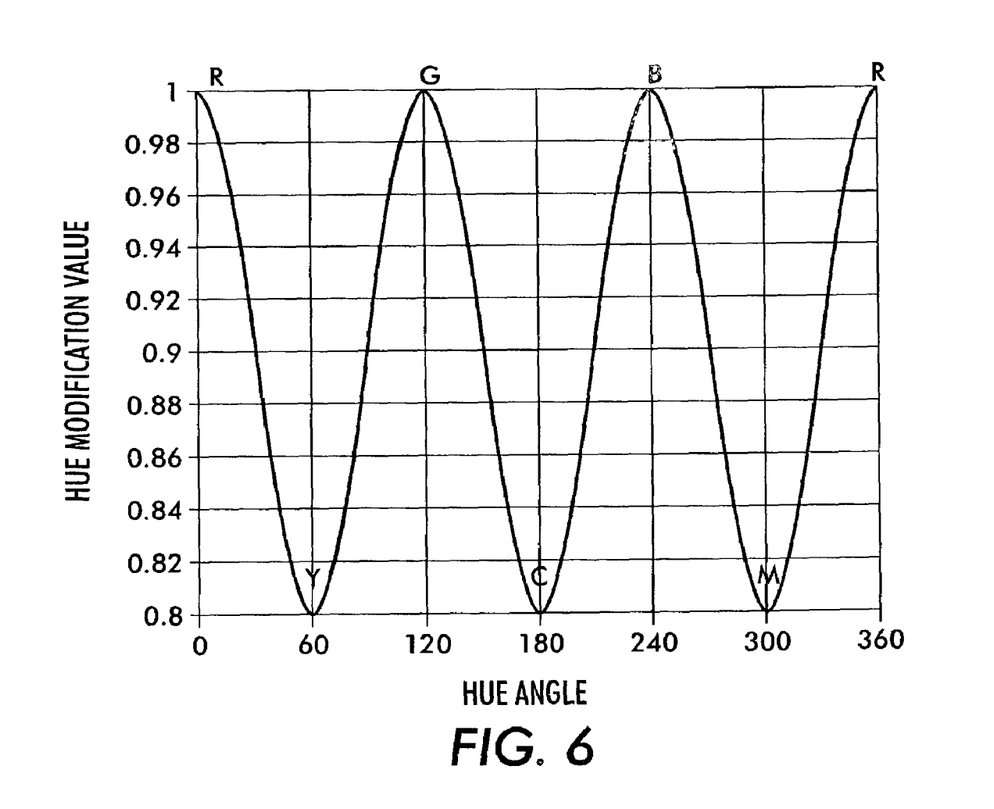
FIG. 6 is a graph of the function with weights for modulating H.

The graph of m is in FIG. 6, for $W_1$=0.1 and $W_2$=0.9. These values were chosen after extensive testing of various ($W_1$, $W_2$) pairs.

Black is generated in the same way for R, G, and B (in which case m(H)=$W_1+W_2$=1 for $W_1$=0.1 and $W_2$=0.9) and in a different way for C, M, and Y (in which case m(H)=$W_1-W_2$=0.8 for $W_1$=0.1 and $W_2$=0.9) as shown in FIG. 6.

Finally for high saturation, low value colors (as compared to thresholds $V_t$ and $S_t$) the black generation method is further refined including a dependence on all three attributes of the input color separations, for example: H, S, and V.

Overall, the black generation strategy is defined as a continuous function of H, S, and V, as in Equation 10.

$$g(H, S, V) = 1 - \begin{cases} a_H S^2 + b_H S + c_H & \text{for } S > S_t \text{ and } V > V_t \\ 1 - \left(1 - \dfrac{V}{V_t}\right)^2 & \text{for } S \leq S_t \text{ and } V < V_t \\ (a_H S^2 + b_H S + c_H)\left[1 - \left(1 - \dfrac{V}{V_t}\right)^2\right] & \text{for } S > S_t \text{ and } V < V_t \\ 1 & \text{for } S \leq S_t \text{ and } V > V_t \end{cases} \quad \text{EQ (10)}$$

Those skilled in the art will appreciate that further improvements may be made by making the low saturation, low value curve also hue dependent.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. In an image output terminal, a method of outputting a digital color image comprising:
converting input components corresponding to a color in a first color space to intermediate components in a second color space, where the second color space includes at least one intermediate component that is different from the input components; and,
deriving an output black component from both the intermediate components and the input components, wherein said deriving includes:
applying a defined process to the input components;
applying a different process to the intermediate components; and,
combining the processed input components and the differently processed intermediate components;
wherein the first color space includes HSV and the applying a defined process comprises applying a function including H, S and V, where the function is different depending on the position of a V value with respect to a threshold.

2. In an image output terminal, a method of outputting a digital color image comprising:
converting input components corresponding to a color in a first color space to intermediate components in a second color space, where the second color space includes at least one intermediate component that is different from the input components; and,
deriving an output black component from both the intermediate components and the input components, wherein said deriving includes:
applying a defined process to the input components;
applying a different process to the intermediate components; and,
combining the processed input components and the differently processed intermediate components;
wherein the first color space includes HSV and the applying a defined process comprises applying a function including H, S and V, where the function is different depending on the position of an S value with respect to a threshold.

3. The method of outputting a digital color image as set forth in claim 2, where the applying a different process to the intermediate components comprises minimizing CMY values.

4. In an image output terminal, a method of outputting a digital color image comprising:
converting input components corresponding to a color in a first color space to intermediate components in a second color space, where the second color space includes at least one intermediate component that is different from the input components; and
deriving an output black component from both the intermediate components and the input components;
wherein the first color space comprises HSV and the deriving comprises:
applying a function to the intermediate components; and
for input components including V below a V threshold and S below an S threshold, applying a function varying with V and the V threshold.

5. The method of outputting a digital color image as set forth in claim 4, further comprising outputting data comprising the intermediate components and the output black component.

6. The system as set forth in claim 4, where the input color space is defined in HSV and the functions include a first function g(H,S,V), and a second function h depending on the intermediate color separation, the system further comprising a calculator which calculates g(H,S,V) by implementing the equation:

$$g(H, S, V) = 1 - \begin{cases} a_H S^2 + b_H S + c_H & \text{for } S > S_t \text{ and } V > V_t \\ 1 - \left(1 - \frac{V}{V_t}\right)^2 & \text{for } S \leq S_t \text{ and } V < V_t \\ (a_H S^2 + b_H S + c_H)\left[1 - \left(1 - \frac{V}{V_t}\right)^2\right] & \text{for } S > S_t \text{ and } V < V_t \\ 1 & \text{for } S \leq S_t \text{ and } V > V_t \end{cases}$$

where coefficients $a_H$, $b_H$ and $c_H$ are different functions of hue angle, and $S_t$ and $V_t$ are threshold values for saturation and value, respectively.

7. The system as set forth in claim 4, where the intermediate color separations are defined in CMY.

8. The system as set forth in claim 4, further comprising a post-processor that adjusts the intermediate color separations based on the calculated achromatic color separation.

* * * * *